United States Patent
Krush (10) Patent No.: US 11,713,647 B2
(45) Date of Patent: Aug. 1, 2023

(54) VISCOSITY DEPENDENT VALVE SYSTEM

(71) Applicant: SCHLUMBERGER TECHNOLOGY CORPORATION, Sugar Land, TX (US)

(72) Inventor: Robert Krush, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 124 days.

(21) Appl. No.: 16/311,998

(22) PCT Filed: Jun. 20, 2017

(86) PCT No.: PCT/US2017/038205
§ 371 (c)(1),
(2) Date: Dec. 20, 2018

(87) PCT Pub. No.: WO2017/223005
PCT Pub. Date: Dec. 28, 2017

(65) Prior Publication Data
US 2020/0308926 A1    Oct. 1, 2020

Related U.S. Application Data

(60) Provisional application No. 62/352,510, filed on Jun. 20, 2016.

(51) Int. Cl.
*E21B 34/06* (2006.01)
*E21B 43/08* (2006.01)
*G05D 11/13* (2006.01)

(52) U.S. Cl.
CPC .............. *E21B 34/06* (2013.01); *E21B 43/08* (2013.01); *G05D 11/136* (2013.01)

(58) Field of Classification Search
CPC ....... E21B 34/08; E21B 34/06; G05D 11/136; G05D 11/12
See application file for complete search history.

(56) References Cited

U.S. PATENT DOCUMENTS 7,114,567 B2    10/2006    Chan et al.
7,561,998 B2     7/2009    Panga et al.
(Continued)

FOREIGN PATENT DOCUMENTS

EP    2669466 A2    12/2013

OTHER PUBLICATIONS

Fischer, Christine, Constien, Vernon, and Carla Vining. "Gravel Pack Sizing Criteria—It's Time to Re-Evaluate." Paper presented at the SPE International Conference and Exhibition on Formation Damage Control, Lafayette, Louisiana, USA, Feb. 2016. doi: https://doi.org/10.2118/179023-MS (Year: 2016).*
(Continued)

*Primary Examiner* — Theodore N Yao
(74) *Attorney, Agent, or Firm* — Matthew Goode (57) ABSTRACT

A technique facilitates control over flow of fluid in a variety of well applications and other applications. A flow control device is used to automatically control flow of fluids based on viscosity of the fluids. For example, the flow control device may be used to automatically allow flow of oil while blocking flow of gas and/or water. According to an embodiment, the flow control device comprises a production circuit and a metering circuit. The production circuit and the metering circuit cooperate to allow flow of a well fluid with a first viscosity and to block flow of well fluid when the well fluid has a different viscosity, e.g. relatively lower viscosity.

16 Claims, 4 Drawing Sheets

(56) References Cited

U.S. PATENT DOCUMENTS

| | | | |
|---|---|---|---|
| 8,291,976 B2 | 10/2012 | Schultz et al. | |
| 8,590,630 B2 | 11/2013 | Mathiesen et al. | |
| 8,646,535 B2 | 2/2014 | Xu et al. | |
| 8,657,017 B2 | 2/2014 | Dykstra et al. | |
| 8,714,266 B2 | 5/2014 | Dykstra et al. | |
| 8,820,414 B2 | 9/2014 | Mathiesen et al. | |
| 8,875,797 B2 | 11/2014 | Aakre et al. | |
| 8,931,566 B2 | 1/2015 | Dykstra et al. | |
| 8,935,094 B2 | 1/2015 | Rubin et al. | |
| 9,316,095 B2 | 4/2016 | Holderman | |
| 9,624,759 B2 | 4/2017 | Mathiesen et al. | |
| 9,683,429 B2 | 6/2017 | Mathiesen et al. | |
| 9,896,907 B2 | 2/2018 | Kucera | |
| 10,047,280 B2 | 8/2018 | Monroe et al. | |
| 10,309,204 B2 | 6/2019 | Krumrine et al. | |
| 2007/0246212 A1* | 10/2007 | Richards | E21B 43/121 166/227 |
| 2009/0101342 A1* | 4/2009 | Gaudette | E21B 43/02 166/276 |
| 2009/0151925 A1 | 6/2009 | Richards et al. | |
| 2010/0024889 A1* | 2/2010 | Walker | E21B 34/06 137/12 |
| 2013/0068467 A1* | 3/2013 | Zhou | E21B 43/12 166/369 |
| 2013/0075107 A1 | 3/2013 | Dykstra et al. | |
| 2013/0092394 A1* | 4/2013 | Holderman | E21B 43/08 166/373 |
| 2013/0186634 A1* | 7/2013 | Fripp | E21B 43/12 166/319 |
| 2015/0021019 A1* | 1/2015 | Veit | E21B 43/08 166/250.15 |
| 2015/0027715 A1 | 1/2015 | Tinnen et al. | |
| 2015/0040990 A1 | 2/2015 | Mathiesen et al. | |
| 2015/0053420 A1* | 2/2015 | Fripp | E21B 43/24 166/373 |
| 2015/0060084 A1* | 3/2015 | Moen | E21B 43/12 166/373 |
| 2016/0061004 A1* | 3/2016 | Tunkiel | E21B 43/12 166/373 |
| 2017/0002625 A1 | 1/2017 | Chochua et al. | |

OTHER PUBLICATIONS

Saucier, R.J.. "Considerations in Gravel Pack Design." J Pet Technol 26 (1974): 205-212. doi: https://doi.org/10.2118/4030-PA (Year: 1974).*

"Parallel circuit" definition, available from: https://www.thefreedictionary.com/parallel+circuit (Year: 2022).*

International Search Report and Written Opinion for corresponding PCT Application Serial No. PCT/US2017/038205, dated Sep. 25, 2017, 16 pages.

International Preliminary Report on Patentability issued in the PCT Application PCT/US2017/038205 dated Dec. 25, 2018 (11 pages).

* cited by examiner

VISCOSITY DEPENDENT VALVE SYSTEM

CROSS-REFERENCE TO RELATED APPLICATION

The present document is based on and claims priority to U.S. Provisional Application Ser. No. 62/352,510, filed Jun. 20, 2016, which is incorporated herein by reference in its entirety.

BACKGROUND

In a variety of well applications, a sand screen completion is deployed downhole into a wellbore. Production fluids flow from a surrounding formation, through sand screens, and into an interior of the sand screen completion for production to the surface. The inflowing fluids are sometimes routed through inflow control devices which are in fluid communication with corresponding sand screens. During production, unwanted fluids, e.g. gas and/or water, may begin to enter the sand screen completion at one or more locations along the wellbore.

SUMMARY

In general, a system and methodology facilitate control over flow of fluid in a variety of well applications and other applications. A flow control device is used in a well completion to automatically control flow of fluids based on viscosity of the fluids. For example, the flow control device may be used to automatically allow flow of oil while blocking flow of gas and/or water. According to an embodiment, the flow control device comprises a production circuit and a metering circuit. By way of example, the production circuit may comprise features such as arrays of fluid nozzles and associated viscosity switches for controlling flow based on viscosity of the fluid flowing through both the production circuit and the metering circuit. By way of further example, the metering circuit may comprise features such as a filter, a viscosity pressure loss device, a metering orifice, and a check valve. The various features cooperate to, for example, allow flow of a given fluid with a higher viscosity and to block flow when the fluid has a relatively lower viscosity.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology which facilitate control over flow of fluid in a variety of well applications and other applications. A flow control device is used to automatically control flow of fluids based on viscosity of the fluids. For example, the flow control device may be used to automatically allow flow of oil while blocking flow of gas and/or water. According to an embodiment, the flow control device comprises a production circuit and a metering circuit. By way of example, the production circuit may comprise features such as arrays of fluid nozzles and associated viscosity switches controlling fluid flow based on viscosity of the fluid flowing through the production circuit and the metering circuit. By way of further example, the metering circuit may comprise features such as a filter, a viscosity pressure loss device, a metering orifice, and a check valve. The various features cooperate to allow flow of a given fluid with a first viscosity, e.g. a higher viscosity, and to block flow when the fluid has a different viscosity, e.g. a relatively lower viscosity.

According to an embodiment, a methodology and system described herein may be used to detect a viscosity difference between two fluids known to be present in hydrocarbon production wells. The methodology may be used to substantially lower the flow of a given fluid having a lower viscosity. For example, methane gas (0.014-0.016 cP) has a lower viscosity than oil (3.0-0.5 cP). Similarly, water (0.3-0.2 cP) has a lower viscosity than various types of oils. The system and methodology may be used to reduce or shut down fluid flow in a well zone when the viscosity of the flowing well fluid becomes sufficiently lower due to, for example, the presence of gas and/or water.

Embodiments described herein comprise an apparatus providing a differential pressure response which differs substantially depending on the viscosity of the fluid flowing through the device. The device may comprise a conventional inflow control device such as a nozzle(s) combined with a fluid control circuit that produces a distinguished pressure response depending on the viscosity difference between fluids produced through the fluid control circuit. Consequently, the method may be used for controlling the flow of unwanted fluid, e.g. unwanted water flow and/or gas flow.

Figure 1:
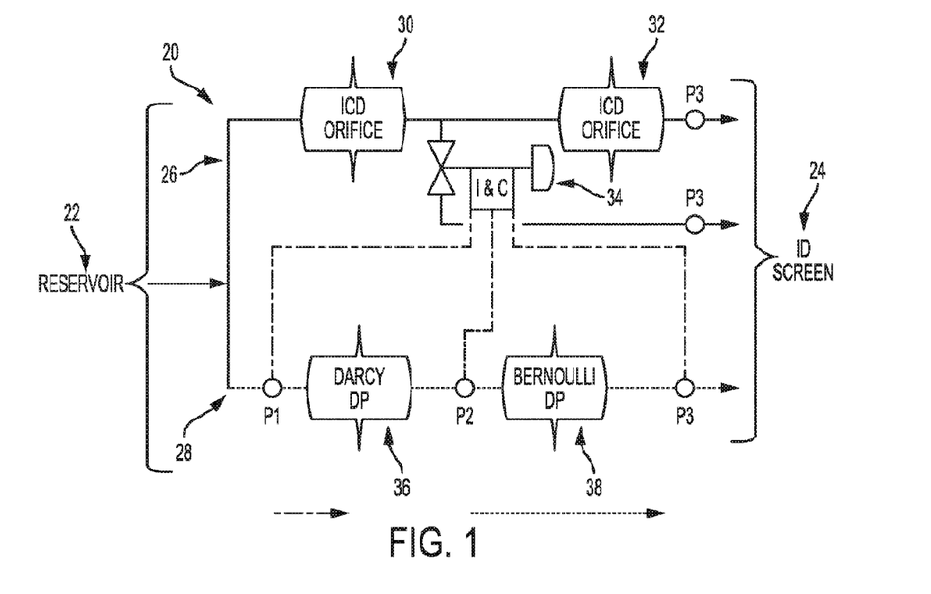
FIG. 1 is a schematic illustration of an example of a flow control device used to automatically control flow of fluids based on viscosity of the fluids, according to an embodiment of the disclosure.

Referring generally to FIG. 1, a schematic illustration is provided of a flow control device 20. In this example, the flow control device 20 automatically exercises control over flow of well fluid from a reservoir 22 to an interior production flow passage 24. The flow control device 20 comprises flow circuitry which may include a production circuit 26 and a metering circuit 28. The production circuit 26 and metering circuit 28 work in cooperation to allow or block flow of the well fluid to the interior production flow passage 24.

By way of example, the production circuit 26 may comprise at least one array of orifices 30. In some embodiments, an additional array or arrays of orifices 32 also are placed in the production circuit 26. Furthermore, the production circuit 26 may comprise at least one viscosity switch 34, e.g. at least one viscosity switching valve 34, which is automatically shifted between open flow and closed positions based on the viscosity of the well fluid passing through the metering circuit 28.

In the example illustrated, the metering circuit 28 is constructed to effectively establish a Darcy differential pressure device 36 and a Bernoulli differential pressure device 38 positioned between pressure zones. According to the embodiment in FIG. 1, three pressure zones P1, P2, P3 are established and the viscosity switching valve 34 may be exposed to the three pressure zones. The three pressure zones comprise, for example, an upstream pressure zone upstream of the differential pressure devices 36, 38, an intermediate pressure zone between the pressure devices 36, 38, and a downstream pressure zone downstream of the pressure devices 36, 38.

Depending on the viscosity of the fluid flowing through the flow control device 20, the Darcy differential pressure device and/or Bernoulli differential pressure device effectively apply a motive pressure to the viscosity switching valve 34 which transitions the switching valve 34 to the corresponding position, e.g. open or closed position. The metering circuit 28 automatically creates different actuating pressures acting on viscosity switching valve 34 according to the viscosity of the well fluid, e.g. oil, water, gas, flowing through the flow control device 20.

Figure 2:
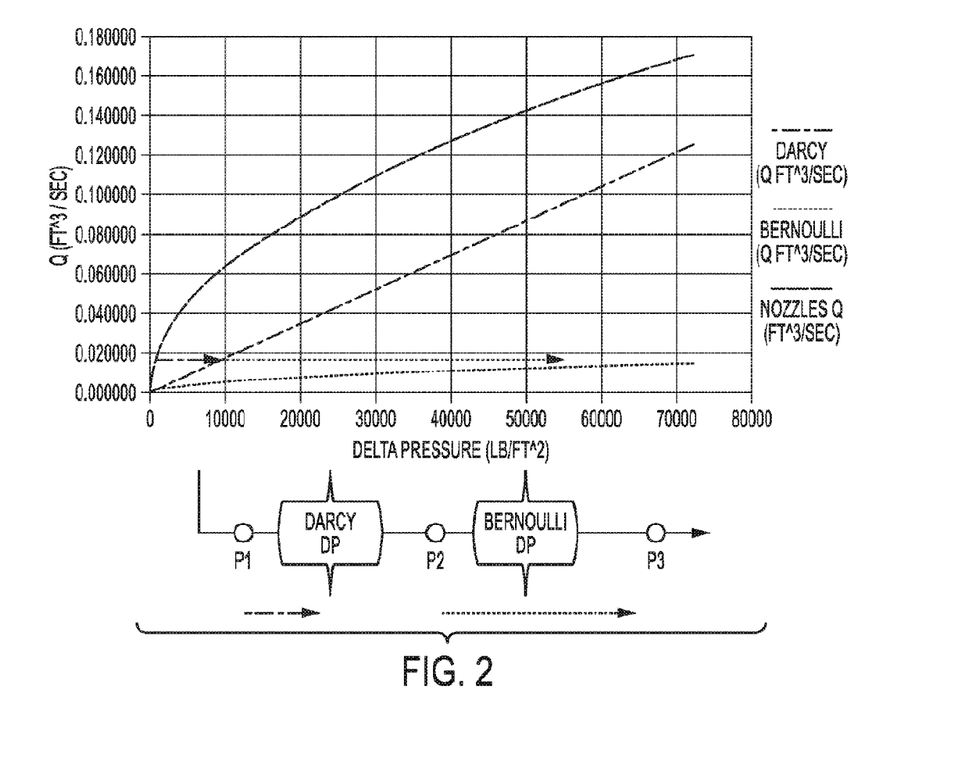
FIG. 2 is a graphical illustration demonstrating a strong signal established between liquid and methane based on the viscosity difference, according to an embodiment of the disclosure.
Figure 3:
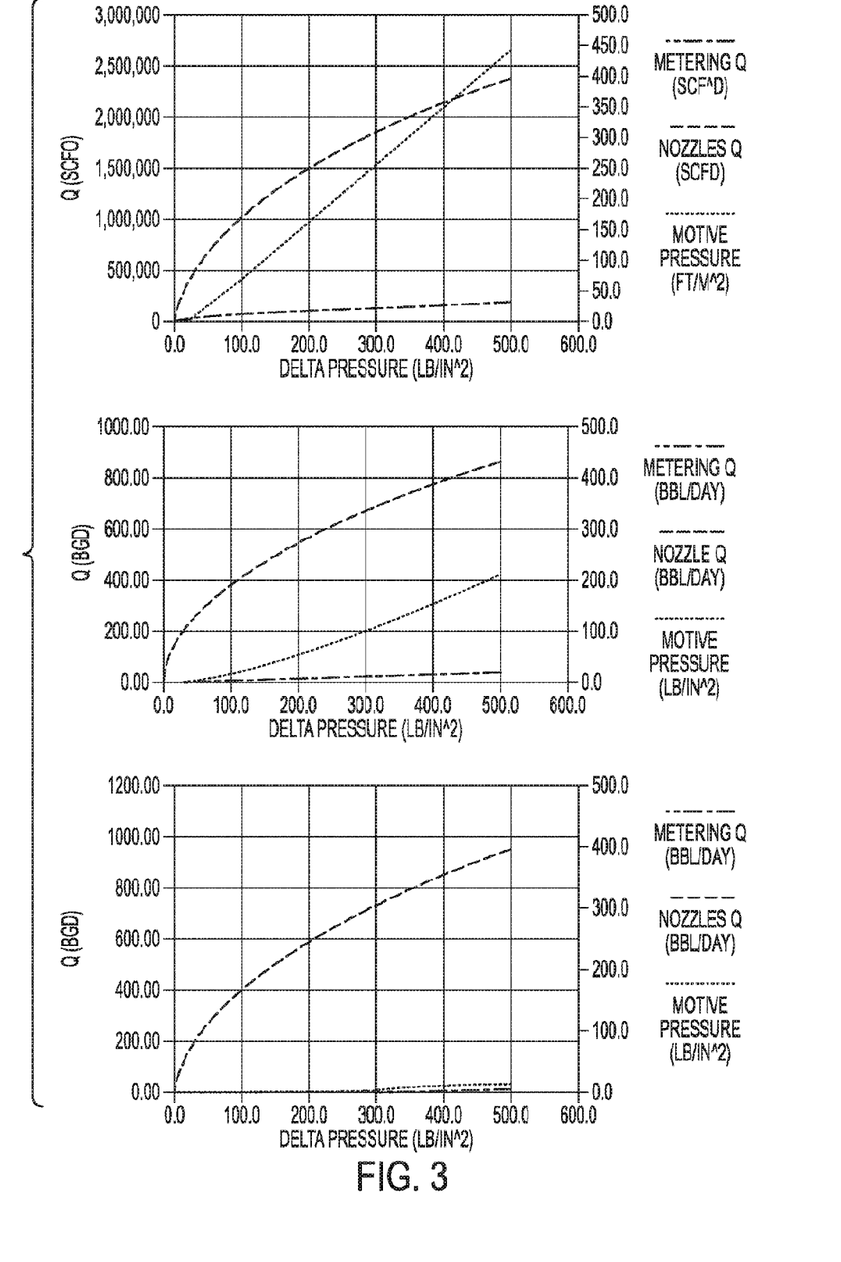
FIG. 3 is a graphical illustration showing motive pressure availability for methane, water, and oil, according to an embodiment of the disclosure.

By way of example, FIG. 2 provides a graphical illustration of the use of this viscosity difference and demonstrates a strong signal established between liquid and methane based on their viscosity difference. In flow control device 20, the strong signal occurs as a different actuating pressure (different motive pressure) acting on viscosity switching valve 34 according to the viscosity of the fluid, e.g. liquid or methane, flowing through the metering circuit 28. In an oil production application, the viscosity differences and thus the differences in motive pressure availability can be used to automatically change the operational position of the flow control device 20. FIG. 3 provides a graphical illustration of the differences in motive pressure availability between methane, water, and oil.

Figure 4:
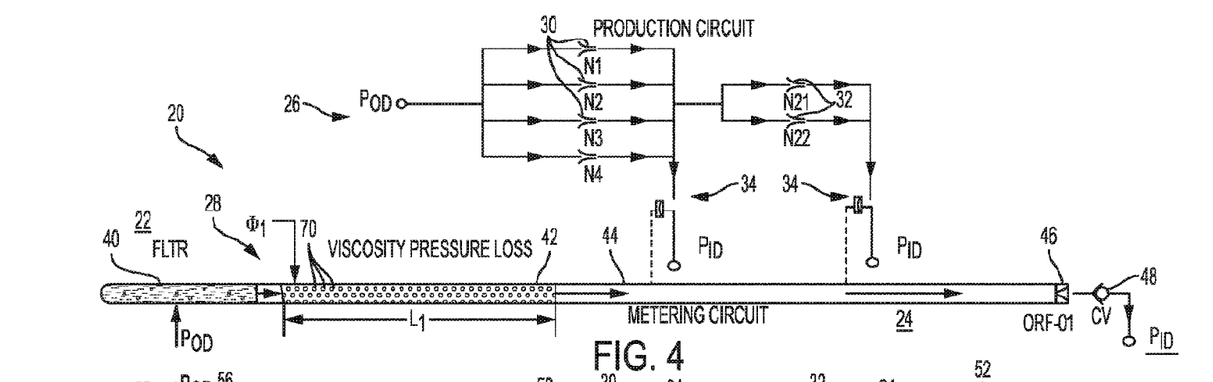
FIG. 4 is a schematic illustration of an example of a flow control device having a combined production circuit and metering circuit, according to an embodiment of the disclosure.

Referring generally to FIG. 4, a schematic illustration is provided of an embodiment of the flow control device 20 having production circuit 26 and metering circuit 28 combined in parallel. In this example, well fluid flows between an external region 22, e.g. a reservoir region, at pressure $P_{OD}$ and an internal region 24, e.g. a production flow passage, at pressure $P_{ID}$.

The production circuit 26 comprises the array of orifices 30 and array of orifices 32 and a plurality of the viscosity switches 34. In the specific example illustrated, the production circuit 26 has one viscosity switch 34 located between the arrays 30, 32 and a second viscosity switch 34 located downstream of the array of orifices 32. It should be noted the arrays of orifices 30, 32 may be in the form of arrays of fluid nozzles through which well fluid flows during, for example, a production operation.

In the embodiment illustrated, the metering circuit 28 may comprise various components, such as a filter 40, a viscosity pressure loss device 42, a flow chamber 44, at least one metering orifice 46, and a check valve 48 positioned sequentially between the external region 22 and the internal region 24. In this example, the viscosity pressure loss device 42 effectively serves as the Darcy differential pressure device 36 and the flow chamber 44 in combination with the orifices 30, 32 and metering orifice 46 serves as the Bernoulli differential pressure device 38.

Figure 5:
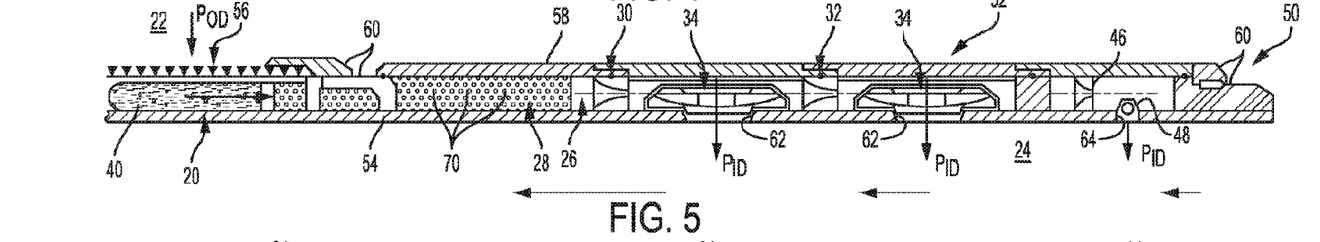
FIG. 5 is a cross-sectional illustration of an example of a portion of a completion system comprising a sand screen assembly including a flow control device, according to an embodiment of the disclosure.

In a well application, the flow control device 20 may be located in a downhole well completion 50 which may include a sand screen assembly 52, as illustrated in FIG. 5. It should be noted various well completions 50 may comprise multiple sand screen assemblies 52, each with its own flow control device 20 to enable independent flow control at different well zones. In the illustrated example, the production circuit 26 and metering circuit 28 of FIG. 4 are integrated into the sand screen assembly 52. The sand screen assembly 52 may comprise various components, such as a base pipe 54 having an interior defining the production flow passage 24. Additionally, the sand screen assembly 52 may comprise a sand screen 56 disposed around base pipe 54 as well as an external tubular housing 58 disposed around base pipe 54 and coupled with the base pipe 54 and sand screen 56 via suitable brackets 60. The sand screen 56 may comprise various types of sand screen filter media.

During a production operation, well fluids flow from the external region/reservoir 22, through sand screen 56, through production circuit 26 and metering circuit 28, and into production flow passage 24 within base pipe 54 via radial base pipe passages 62. It should be noted a portion of the well fluid also flows into production flow passage 24 through a base pipe passage 64 associated with check valve 48. In the example illustrated, the parallel production circuit 26 and metering circuit 28 are located externally of base pipe 54 and under both the sand screen 56 and the housing 58. However, the metering circuit 28 may be located at least partially external to the sand screen filter media 56. In some embodiments, access may be provided to the orifices/ nozzles 30, 32 and metering orifice 46 so that they may be changed out. For example, a range of nozzles or orifices 30, 32 with varying diameters may be selected depending upon the desired resistance to flow.

Referring again to the embodiment of FIG. 5, the viscosity switches 34 are in the form of viscosity switch valves. The viscosity switch valves 34 may be located at base pipe passages 62 radially between base pipe 54 and surrounding tubular housing 58. Longitudinally, the first viscosity switch valve 34 may be positioned between array of orifices 30 and array of orifices 32. The second viscosity switch valve 34 may be positioned between array of orifices 32 and the at least one metering orifice 46.

Figure 7:
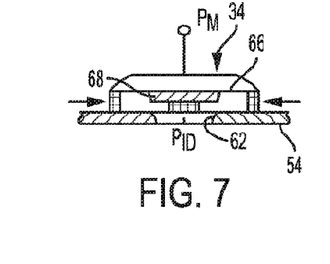
FIG. 7 is an illustration similar to that of FIG. 6 but with the valve in an intermediate flow position, according to an embodiment of the disclosure.
Figure 8:
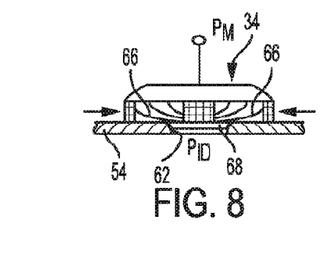
FIG. 8 is an illustration similar to that of FIG. 6 but with the valve in a closed position, according to an embodiment of the disclosure.

Depending on the application, the viscosity switch valves 34 may be actuated via motive pressure established according to the viscosity of the well fluid and may be transitioned to corresponding positions, such as an open position (see FIG. 6), an intermediate position (see FIG. 7), and a closed position (see FIG. 8). In some applications, the viscosity switch valves 34 may be binary, open-close valves.

Figure 6:
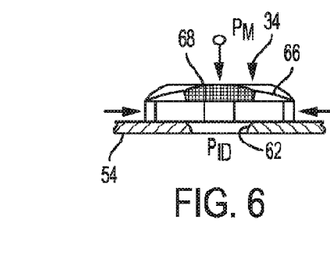
FIG. 6 is a cross-sectional illustration of an example of a valve of the flow control device in an open flow position, according to an embodiment of the disclosure.

According to an embodiment, each viscosity switch valve 34 may be in the form of a valve having a flexible diaphragm 66, e.g. flexible metal diaphragm, and a plug 68 which moves over center to maintain the valve in either an open or closed position depending on the motive pressure (Pm) conveyed to the valve. As discussed above, the motive pressure is established based on the viscosity of the fluid flowing through flow control device 20. In another example, the viscosity switches 34 may comprise valves biased open and having flexible metallic or elastomer diaphragms. Regardless, the viscosity switches/valves 34 may be constructed to actuate at different motive pressures depending upon their diameter and the stiffness of the diaphragms. Pressure applied along production flow passage 24 from, for example, the wellhead may be used to reopen the valves 34 after they have been actuated so as to reset them to their original position.

When fluid with a low viscosity, e.g. methane gas, is encountered by the flow control device 20, a motive pressure is produced in the metering circuit 28 due to the flow rate being higher through the viscosity pressure loss device 42 than can be flowed through the metering orifice 46. The metering orifice 46 produces a back pressure which is effectively applied to the viscosity switches 34. The viscosity switches 34 are actuated to different operational positions according to the different motive pressure $P_m$ levels resulting from flow of well fluids through the viscosity pressure loss device 42 and ultimately through the metering orifice 46. If the well fluid comprises a mixed production fluid having, for example, liquid and methane gas, the mixed fluid can flow through the second array of nozzles 32 prior to the entire methane gas constituent being conveyed through just the metering orifice 46 thus affecting the motive pressure.

When higher viscosity fluids are encountered by metering circuit 28, the viscosity pressure loss device 42 effectively slows the flow and the motive pressure on viscosity switch valves 34 disappears because the metering orifice 46 is able to flow more fluid than the viscosity pressure loss device 42. As a result, the viscosity switch valves 34 remaining in an open flow position, and production flow of well fluids can pass through the first stage of production nozzles/orifices 30 and to the production flow passage 24, e.g. to the inside of base pipe 54.

The magnitude of the motive pressure is related to the viscosity of the fluid being produced. As a fluid viscosity increases, the resistance in the viscosity pressure loss device 42 increases thus decreasing the metering fluid flow rate. The metering fluid flow rate is decreased until the metering orifice 46 can flow all of the metering fluid and no motive pressure is produced. With no motive pressure (or sufficiently low motive pressure) the viscosity switches 34 remain in an open flow position.

According to an embodiment, the viscosity pressure loss device 42 may be constructed from a bead filled tube packed with beads 70, e.g. a ceramic bead filled tube, or a series of fluid passage restrictions. The length, cross-sectional flow area, and diameter of the beads or restrictions can be varied to produce a suitable motive pressure response for the production fluid. Additionally, the filter 40 may be located at the entrance of the viscosity pressure loss device 42 and can be sized to prevent plugging or fouling of the viscosity pressure loss device 42.

Figures 9, 11, 12, 13:
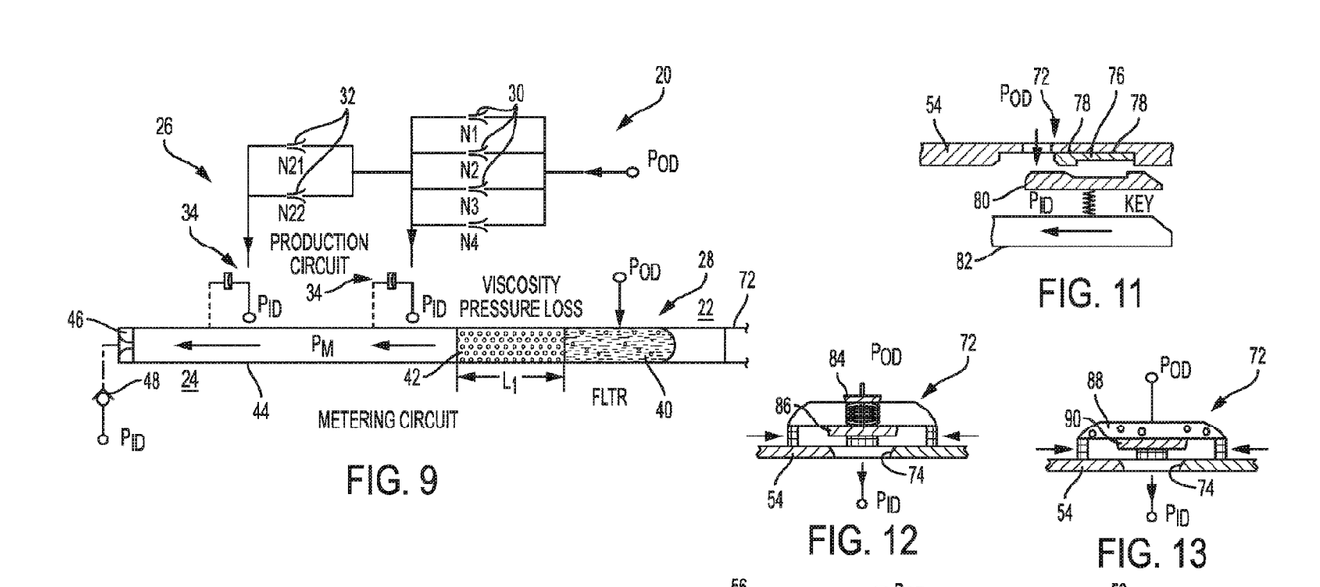
FIG. 9 is a schematic illustration of another example of a flow control device having a production circuit and a metering circuit, according to an embodiment of the disclosure.
FIG. 11 is a cross-sectional illustration of an example of a gravel packing switch for closing off fluid flow following a gravel packing operation, according to an embodiment of the disclosure.
FIG. 12 is a cross-sectional illustration of another example of a gravel packing switch for closing off fluid flow following a gravel packing operation, according to an embodiment of the disclosure.
FIG. 13 is a cross-sectional illustration of another example of a gravel packing switch for closing off fluid flow following a gravel packing operation, according to an embodiment of the disclosure.
Figure 10:
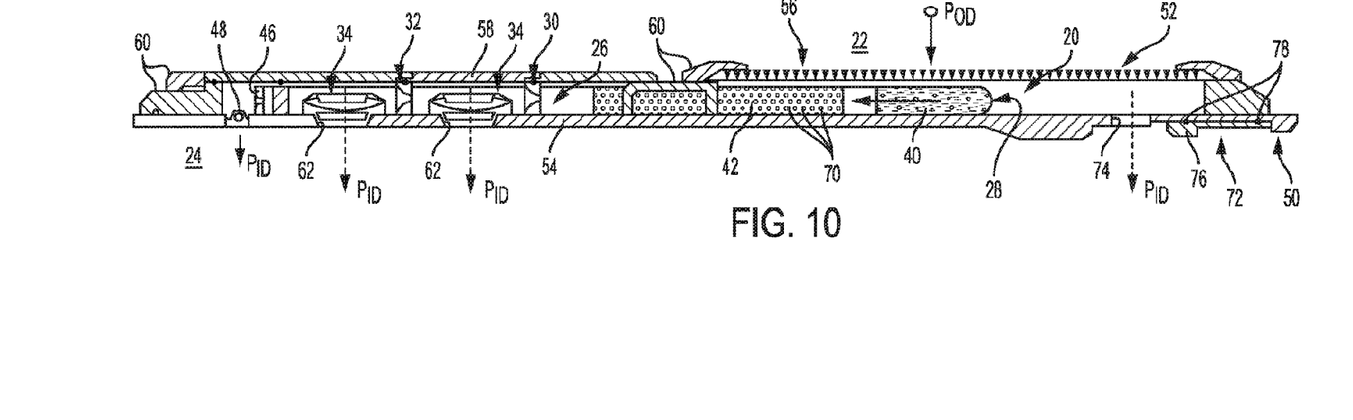
FIG. 10 is a cross-sectional illustration of an example of a portion of a completion system comprising a sand screen assembly including a flow control device in which the sand screen assembly may be used in a gravel packing operation, according to an embodiment of the disclosure.

Referring generally to FIGS. 9-10, another embodiment of flow control device 20 and sand screen assembly 52 is illustrated and is of the type that may be utilized in a gravel packing operation. In this embodiment, a similar arrangement of production circuit 26 and metering circuit 28 may be located at an uphole end of sand screen assembly 52. An additional gravel packing switch 72 may be placed, for example, upstream of filter 40 to control flow of clean fluid returns through an aperture 74 (or apertures 74) disposed through the wall of base pipe 54 (see FIG. 10).

The gravel packing switch 72 allows clean fluid returns to be conveyed from an outside diameter of the sand screen assembly 52 to the inside production flow passage 24 during gravel packing treatments. Upon completion of the gravel pack, the gravel packing switch 72 may be transitioned to a closed position blocking further inflow of fluid through aperture(s) 74. At this stage, the well fluid is able to flow through production circuit 26 and metering circuit 28 and viscosity switches 34 are automatically transitioned to flow positions corresponding with the viscosity of the well fluid as described above.

Depending on the parameters of a given gravel packing operation, the gravel packing switch 72 may be constructed in a variety of configurations. Referring generally to FIG. 11, for example, the gravel packing switch 72 may comprise a sliding sleeve 76 slidably mounted along an interior of base pipe 54 and sealed thereto via seals 78. The sliding sleeve 76 may be shifted to a closed position via a corresponding key 80 carried by, for example, a wash pipe 82 or other suitable tool. The corresponding key 80 may be spring-loaded for engagement with sliding sleeve 76 to facilitate engagement and shifting of the sliding sleeve 76 after completion of the gravel pack.

However, the gravel packing switch 72 may comprise other configurations such as those illustrated in FIGS. 12 and 13. In FIG. 12, the gravel packing switch 72 comprises a water dissolvable trigger 84 which dissolves in the presence of water (or other chemical) to release a spring-loaded plug 86 which is then moved into aperture 74 to block further flow therethrough. In another example, the gravel packing switch 72 comprises an oil swellable material 88 coupled with a corresponding plug 90. In the presence of oil, the swellable material 88 expands and drives the corresponding plug 90 into aperture 74 to similarly block further flow therethrough. Once aperture 74 is plugged, production of well fluid may then be commenced by flowing production fluids through the sand screen assembly 52 and flow control device 20 as described above.

The flow control device 20 may be used in many well related operations for controlling flows of well fluids. In various applications, well completion 50 may comprise multiple sand screen assemblies 52 deployed at different well zones. Use of flow control devices 20 in the sand screen assemblies 52 enable control over inflowing well fluid based on viscosities of those inflowing fluids. Consequently, inflow of fluid at specific well zones may be blocked when undesirable fluids enter the corresponding sand screen assembly 52.

As described above, the components of production circuit 26 and metering circuit 28 may be adjusted to cause a desired actuation of viscosity switches 34 in the presence of specific types of fluid. For example, in the production of conventional oil, the flow control device 20 may be constructed to actuate the viscosity switches 34 in the presence of gas, e.g. methane. Similarly, the flow control device 20 may be constructed to actuate the viscosity switches 34 in the presence of water or specific oil/water mixtures.

The flow control device 20 also may be used in heavy oil applications, e.g. applications in which the oil viscosity is in the 10-100 cP range at downhole conditions, to close off flow in the presence of, for example, water or lower viscosity oil. By way of example, the viscosity difference between certain oils and water produces a suitable motive pressure to actuate viscosity switches 34. When water is encountered in this type of application, production flow is forced through the nozzle arrays 30, 32 and metering orifice 46 in a manner which creates increased levels of motive pressure acting on viscosity switches 34. Consequently, the flow rate into production flow passage 24 via base pipe passages 62 is substantially reduced as the higher pressure closes the viscosity switches/valves 34. A small remaining flow of well fluid may flow through the metering circuit orifice 46.

Accordingly, the flow control devices 20 and their corresponding viscosity switches 34 may be used to limit unwanted production of undesirable fluid, e.g. gas and/or water. When unwanted gas production occurs, for example, back pressure from the orifice 46 is greater than the friction loss to the Darcy type resistance device 36 and a motive pressure is created to close the corresponding viscosity switch/valve 34. The differential pressure is constant across the flow control device nozzles 30, 32 and the corresponding metering circuit flow path (divide the pressure loss through the control circuit to detect viscosity difference-Darcy versus Bernoulli DP).

According to a gas production example, the flow control device 20 uses the differential pressure across the orifice 46 and the motive pressure within the sand screen assembly 52 to close the first viscosity switch 34. Production flow is then forced through the next set of nozzles 32. Sufficient additional differential pressure across orifice 46 effectively closes the second viscosity switch 34 to prevent gas flow through base pipe passages 62 and into the production flow passage 24. It should be noted that a small amount of gas may be produced to stabilize the metering circuit 28. An applied pressure from, for example, the wellhead may be applied along the production flow passage 24 to reset the viscosity switches 34 to an open position.

During liquid production in which there is little or no motive pressure, the viscosity switches remain open. A conventional inflow control device orifice may be used to increase differential pressure for use in limiting water production. In this type of application, the Bernoulli differential pressure may be primarily utilized for flow control.

The viscosity-based flow control device 20 may be used in a variety of applications, including horizontal or vertical stand-alone screens, vertical gravel packs, production wells, and/or for reduction of gas production without intervention services. The methodology may be employed in conventional reservoirs to encourage liquid production, to reduce a bottleneck of gas production at the top side, and to improve hydrocarbon recovery. Additionally, the methodology may be used in the production of heavy oil to decrease unwanted water production. The methodology also may be used in unconventional (tight) reservoirs to reduce gas breakthrough for artificial lift components.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for controlling flow of well fluids within a wellbore, comprising:
a sand screen assembly deployable in the wellbore, the sand screen assembly comprising a base pipe, a sand screen disposed about the base pipe and deployable within the wellbore concurrently with the base pipe, and a flow control device comprising:
a production circuit positioned in fluid communication with the sand screen and an interior of the base pipe via viscosity switches positioned within the production circuit and operable to control flow from the production circuit to the interior of the base pipe, the production circuit having arrays of fluid nozzles; and
a metering circuit positioned in fluid communication with the sand screen and the interior of the base pipe via a check valve, the metering circuit positioned in parallel to the production circuit such that a first portion of the well fluids flow through the production circuit into the interior of the base pipe and a second portion of the well fluids flow through the metering circuit into the interior of the base pipe, the metering circuit having a filter, a viscosity pressure loss device, a metering orifice, and the check valve positioned sequentially and the metering circuit in pressure communication with the viscosity switches such that changes in viscosity of the well fluids flowing through the metering circuit opens or closes the viscosity switches,
wherein the filter is located in an annular space between the sand screen and the base pipe.

2. The system as recited in claim 1, wherein the arrays of fluid nozzles comprise a pair of arrays.

3. The system as recited in claim 1, wherein the viscosity pressure loss device comprises a bead filled tube.

4. The system as recited in claim 1, wherein the viscosity pressure loss device comprises a series of fluid passage restrictions.

5. The system as recited in claim 1, wherein the viscosity switches are located within an outer housing and externally of the base pipe.

6. The system as recited in claim 1, wherein the arrays of fluid nozzles and the viscosity switches utilize pressure differentials which close the viscosity switches in a presence of a gas flow.

7. The system as recited in claim 1, wherein the arrays of fluid nozzles and the viscosity switches utilize pressure differentials which close the viscosity switches in a presence of a water flow.

8. The system as recited in claim 1, wherein the viscosity switches each comprise a plug mounted on a diaphragm.

9. A system deployable in a wellbore, the system comprising:

a well completion having a sand screen assembly that, when deployed in the wellbore, allows well fluids to flow from an exterior to an interior production flow passage during production of the well fluids, the sand screen assembly comprising:
- a base pipe through which the well fluids flow to the interior production flow passage;
- a sand screen deployable within the wellbore concurrently with the base pipe; and
- a flow control device having:
  - a production circuit positioned in fluid communication with the sand screen and the interior production flow passage via viscosity switches positioned within the production circuit and operable to control flow from the production circuit to the interior production flow passage; and
  - a metering circuit positioned in fluid communication with the sand screen and the interior production flow passage, the metering circuit positioned in parallel to the production circuit such that a first portion of the well fluids flow through the production circuit into the interior production flow passage and a second portion of the well fluids flow through the metering circuit into the interior production flow passage, the metering circuit in pressure communication with the viscosity switches such that changes in viscosity of the well fluids flowing through the metering circuit opens or closes the viscosity switches,
    - wherein the metering circuit comprises a filter, a viscosity pressure loss device, and a metering orifice positioned sequentially, and
    - wherein the filter is located in an annular space between the sand screen and the base pipe.

10. The system as recited in claim 9, wherein the production circuit comprises arrays of fluid nozzles.

11. The system as recited in claim 10, wherein the viscosity switches open or close depending on the viscosity of the well fluid flowing through the viscosity pressure loss device and the arrays of fluid nozzles.

12. The system as recited in claim 11, wherein the arrays of fluid nozzles and the viscosity switches utilize pressure differentials which close viscosity switches in a presence of a gas flow.

13. The system as recited in claim 11, wherein the arrays of fluid nozzles and the viscosity switches utilize pressure differentials which close viscosity switches in a presence of a water flow.

14. The system as recited in claim 10, wherein the viscosity pressure loss device comprises a bead filled tube.

15. A method, comprising:
- placing a sand screen assembly comprising a base pipe, a sand screen, a flow control device, and viscosity switching valves in a well completion; then
- deploying the well completion in a wellbore, wherein the base pipe and sand screen are deployed concurrently in the wellbore; and then
- using the flow control device selectively allow well fluids into the base pipe, the method further comprising:
- constructing the flow control device with a production circuit positioned in fluid communication with the sand screen and an interior of the base pipe via the viscosity switching valves positioned within the production circuit and operable to control flow from the production circuit to the interior of the base pipe and a metering circuit positioned in fluid communication with the sand screen and the interior of the base pipe and further positioned in parallel to the production circuit such that a first portion of the well fluids flow through the production circuit into the interior of the base pipe and a second portion of the well fluids flow through the metering circuit into the interior of the base pipe, the metering circuit in pressure communication with the viscosity switching valves such that changes in viscosity of the well fluids flowing through the metering circuit opens or closes the viscosity switching valves; and
- forming the metering circuit with a filter, a viscosity pressure loss device, and a metering orifice positioned sequentially,
- wherein the filter is located in an annular space between the sand screen and the base pipe.

16. The method as recited in claim 15, further comprising forming the production circuit with arrays of fluid nozzles working in cooperation with the viscosity switching valves.

* * * * *